(12) United States Patent
Strohmaier et al.

(10) Patent No.: US 7,255,849 B2
(45) Date of Patent: Aug. 14, 2007

(54) EMM-3, NEW CRYSTALLINE MICROPOROUS MATERIAL

(75) Inventors: Karl G. Strohmaier, Port Murray, NJ (US); Arthur W. Chester, Cherry Hill, NJ (US); William R. Harrison, Edison, NJ (US); James C. Vartuli, Schwenksville, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 435 days.

(21) Appl. No.: 10/863,125

(22) Filed: Jun. 8, 2004

(65) Prior Publication Data

US 2004/0265204 A1   Dec. 30, 2004

Related U.S. Application Data

(60) Provisional application No. 60/480,973, filed on Jun. 24, 2003.

(51) Int. Cl.
*C01B 37/04* (2006.01)
*C01B 37/08* (2006.01)

(52) U.S. Cl. ............ 423/718; 423/305; 423/306; 423/DIG. 30; 502/208; 502/214; 208/46

(58) Field of Classification Search ......... 423/305, 423/306, DIG. 30, 718; 502/208, 214
See application file for complete search history.

(56) References Cited

U.S. PATENT DOCUMENTS 3,010,789 A * 11/1961 Milton ............... 423/718
4,310,440 A * 1/1982 Wilson et al. ............. 502/208
4,440,871 A * 4/1984 Lok et al. ................. 502/214
5,096,684 A    3/1992 Guth et al. ............... 423/306
5,104,495 A * 4/1992 Chang et al. ............. 208/46
5,397,561 A * 3/1995 Smith ....................... 423/704
5,756,789 A * 5/1998 Bruce et al. ............... 556/14
6,436,869 B1    8/2002 Searle et al. .............. 502/214
6,471,941 B1   10/2002 Boix et al. ................ 423/707
2005/0090389 A1* 4/2005 Zones et al. .............. 502/214

FOREIGN PATENT DOCUMENTS

EP      0993867 A1    4/2000
WO   WO01/64335 A2   9/2001

* cited by examiner

*Primary Examiner*—David Sample
(74) *Attorney, Agent, or Firm*—Paul E. Purwin

(57) ABSTRACT

EMM-3 (ExxonMobil Material number 3) is a new crystalline microporous material with a framework of tetrahedral atoms connected by atoms capable of bridging the tetrahedral atoms, the tetrahedral atom framework being defined by the interconnections between the tetrahedrally coordinated atoms in its framework. EMM-3 can be prepared in aluminophosphate (AlPO) and metalloaluminophosphate (MeAPO) compositions with the hexamethonium template. It has a unique X-ray diffraction pattern, which identifies it as a new material. EMM-3 is stable to calcination in air, absorbs hydrocarbons, and is catalytically active for hydrocarbon conversion.

33 Claims, 7 Drawing Sheets

Framework structure of EMM-3 showing only the tetrahedral atoms. There are four unit cells, whose edges are defined by the gray boxes.

Framework structure of EMM-3 showing only the tetrahedral atoms. There are four unit cells, whose edges are defined by the gray boxes.

Polyhedral subunits found in the structure of EMM-3. Only the tetrahedral atoms are shown.

a          b

Column subunits found only in the structure of EMM-3, a: subunit 3a, b: subunit 3b. Only the tetrahedral atoms are shown.

X-ray diffraction pattern of AlPO-EMM-3, as synthesized from example 1.

X-ray diffraction pattern of AlPO-EMM-3, calcined/dehydrated from example 2.

X-ray diffraction pattern of AlPO-EMM-3, calcined/hydrated from example 2

X-ray diffraction pattern of SAPO EMM-3 as prepared - example 6

EMM-3, NEW CRYSTALLINE MICROPOROUS MATERIAL

This application claims the benefit of U.S. Provisional Application No. 60/480,973 filed Jun. 24, 2003.

BACKGROUND OF THE INVENTION

Microporous materials, including zeolites and silicoaluminophosphates, are widely used in the petroleum industry as absorbents, catalysts and catalyst supports. Their crystalline structures consist of three-dimensional frameworks containing uniform pore openings, channels and internal cages of dimensions (<20 Å) similar to most hydrocarbons. The composition of the frameworks can be such that they are anionic, which requires the presence of non-framework cations to balance the negative charge. These non-framework cations are exchangeable, and if converted to the proton form, imparts the material with Bronstead acid sites having catalytic activity. The combination of acidity and restricted pore openings gives these materials catalytic properties unavailable with other materials due to their ability to exclude or restrict some of the products, reactants, and/or transition states in many reactions. Non-reactive materials, such as pure silica and aluminophosphate frameworks are also useful and can be used in absorption and separation processes of liquids, gases, and reactive molecules such as alkenes.

The family of crystalline microporous compositions known as molecular sieves, which exhibit the ion-exchange and/or adsorption characteristics of zeolites are the aluminophosphates, identified by the acronym AlPO, and substituted aluminophosphates as disclosed in U.S. Pat. Nos. 4,310,440 and 4,440,871. U.S. Pat. No. 4,440,871 discloses a class of silica aluminophosphates, which are identified by the acronym SAPO and which have different structures as identified by their X-ray diffraction pattern. The structures are identified by a numerical number after AlPO, SAPO, MeAPO (Me=metal), etc. (Flanigen et al., *Proc. 7th Int. Zeolite Conf.*, p. 103 (1986) and may include Al and P substitutions by B, Si, Be, Mg, Ge, Zn, Fe, Co, Ni, etc. The present invention is a new molecular sieve having a unique framework structure.

ExxonMobil and others extensively use various microporous materials, such as faujasite, mordenite, and ZSM-5 in many commercial applications. Such applications include reforming, cracking, hydrocracking, alkylation, oligomerization, dewaxing and isomerization. Any new material has the potential to improve the catalytic performance over those catalysts presently employed.

There are currently over 135 known microporous framework structures as tabulated by the International Zeolite Association. There exists the need for new structures, having different properties than those of known materials, for improving the performance of many hydrocarbon processes. Each structure has unique pore, channel and cage dimensions, which gives its particular properties as described above. EMM-3 is a new framework material.

SUMMARY OF THE INVENTION

EMM-3 (ExxonMobil Material number 3) is a new crystalline microporous material having a framework of tetrahedral atoms connected by bridging atoms, the tetrahedral atom framework being defined by the interconnections between the tetrahedrally coordinated atoms in its framework. EMM-3 is stable to calcination in air, absorbs hydrocarbons, and is catalytically active for hydrocarbon conversion.

In a preferred embodiment, the new crystalline material is a metalloaluminophosphate compound having a composition $R_m Me_x Al_y P_z O_4 \cdot nH_2O$ where R is an organic compound, Me is one or more of B, Ga, Si, Ge, Zn, Mg, Fe, Co, Ni, Be, Mn, Ti, Zr, and where m=0.01-1, x=0.00-0.2, y=0.6-1.2, z=0.6-1.2 and n=0.5-10 and having a unique diffraction pattern as given in TABLE 2 when x=0 and TABLE 3 when x>0.

In a more preferred embodiment, the calcined crystalline metalloaluminophosphate compound has a composition $Me_x Al_y P_z O_4 \cdot nH_2O$, where Me is one or more of B, Ga, Si, Ge, Zn, Mg, Fe, Co, Ni, Be, Mn, Ti, Zr, and where x=0.00-0.2, y=0.6-1.2, z=0.6-1.2 and n=0-10, and having a unique diffraction pattern as given in TABLE 4 when n>0.2 and in TABLE 5 when n<0.2.

The invention includes new structural subunits or columns of tetrahedral and bridging atoms.

The invention includes a method of synthesizing a crystalline aluminophosphate or metalloaluminophosphate compound having the diffraction pattern similar to TABLE 2 or TABLE 3, by mixing together a source of, alumina, phosphorous, organic directing agent, water, and optional metal and heating at a temperature and time sufficient to crystallize the aluminophosphate or metalloaluminophosphate.

The invention includes the use of EMM-3 to separate hydrocarbons from a hydrocarbon containing stream.

The invention also includes the use of EMM-3 as a hydrocarbon conversion catalyst for converting an organic feedstock to conversion products.

DETAILED DESCRIPTION OF THE PREFERRED EMBODIMENTS

Figure 1:
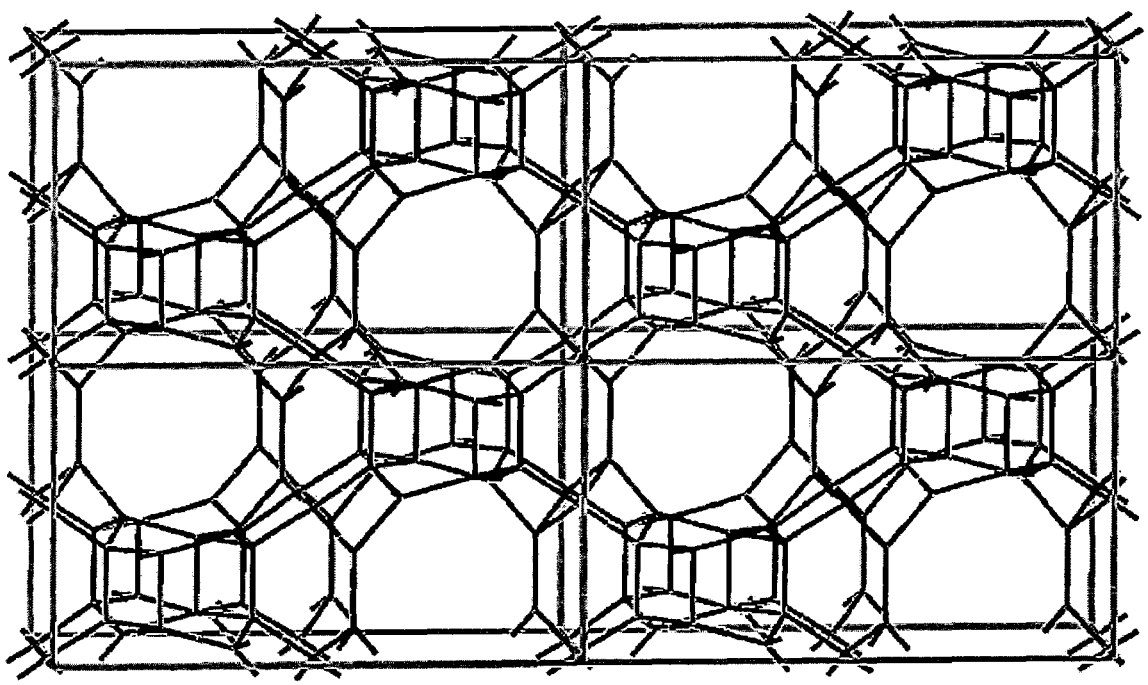
FIG. 1 shows the framework structure of EMM-3 showing only the tetrahedral atoms. There are four unit cells, whose edges are defined by the gray boxes.

The present invention is a new structure As with any porous crystalline material, the structure of EMM-3 can be defined by the interconnections between the tetrahedrally coordinated atoms in its framework. In particular, EMM-3 has a framework of tetrahedral (T) atoms connected by bridging atoms, wherein the tetrahedral atom framework is defined by connecting the nearest tetrahedral (T) atoms in the manner shown in TABLE 1 below.

TABLE 1

EMM-3 tetrahedral atom interconnections

| T atom | Connected to: |
|---|---|
| T1 | T2, T23, T34, T38 |
| T2 | T1, T4, T7, T24 |
| T3 | T5, T8, T18, T20 |
| T4 | T2, T17, T35, T45 |
| T5 | T3, T17, T30, T35 |
| T6 | T7, T24, T29, T42 |
| T7 | T2, T6, T9, T23 |
| T8 | T3, T10, T14, T22 |
| T9 | T7, T13, T39, T43 |
| T10 | T8, T13, T25, T39 |
| T11 | T12, T19, T28, T29 |
| T12 | T11, T14, T16, T21 |
| T13 | T9, T10, T17, T22 |
| T14 | T8, T12, T25, T48 |
| T15 | T16, T21, T33, T34 |
| T16 | T12, T15, T18, T19 |
| T17 | T4, T5, T13, T20 |
| T18 | T3, T16, T30, T47 |
| T19 | T11, T16, T33, T46 |
| T20 | T3, T17, T45, T47 |
| T21 | T12, T15, T28, T44 |
| T22 | T8, T13, T43, T48 |
| T23 | T1, T7, T42, T44 |
| T24 | T2, T6, T38, T46 |
| T25 | T10, T14, T26, T47 |
| T26 | T25, T28, T31, T48 |
| T27 | T29, T32, T42, T44 |
| T28 | T11, T21, T26, T41 |
| T29 | T6, T11, T27, T41 |
| T30 | T5, T18, T31, T48 |
| T31 | T26, T30, T33, T47 |
| T32 | T27, T34, T38, T46 |
| T33 | T15, T19, T31, T37 |
| T34 | T1, T15, T32, T37 |
| T35 | T4, T5, T36, T43 |
| T36 | T35, T38, T40, T45 |
| T37 | T33, T34, T41, T46 |
| T38 | T1, T24, T32, T36 |
| T39 | T9, T10, T40, T45 |
| T40 | T36, T39, T42, T43 |
| T41 | T28, T29, T37, T44 |
| T42 | T6, T23, T27, T40 |
| T43 | T9, T22, T35, T40 |
| T44 | T21, T23, T27, T41 |
| T45 | T4, T20, T36, T39 |
| T46 | T19, T24, T32, T37 |
| T47 | T18, T20, T25, T31 |
| T48 | T14, T22, T26, T30 |

This new crystalline metalloaluminophosphate compound has a composition $R_m Me_x Al_y P_z O_4 \cdot n H_2 O$ where R is an organic compound, Me is one or more of B, Ga, Si, Ge, Zn, Mg, Fe, Co, Ni, Be, Mn, Ti, Zr, and where m=0.01-1, x=0.00-0.2, y=0.6-1.2, z=0.6-1.2 and n=0.5-10. The unique diffraction pattern is given in TABLE 2 when x=0 (AlPO EMM-3) and TABLE 3 when x>0 (SAPO, MeAPO EMM-3).

Other embodiments of the new structure include a calcined compound of composition $Me_x Al_y P_z O_4 \cdot n H_2 O$, where Me is one or more of B, Ga, Si, Ge, Zn, Mg, Fe, Co, Ni, Be, Mn, Ti, Zr, and where m=0.00-0.1, x=0.00-0.2, y=0.6-1.2, z=0.6-1.2 and n=0-10. This compound has the unique diffraction pattern given in TABLE 4 when n>0.2 and in TABLE 5 when n<0.2.

These new compounds are made by the method of mixing together a source of, alumina, phosphorous, organic directing agent, water, and optional source of metal and heating at a temperature and time sufficient to crystallize the metalloaluminophosphate. The method is described below.

The synthetic porous crystalline material of this invention, EMM-3, is a crystalline phase which has a unique 2-dimensional channel system comprising sinusoidal, elliptical channels, each of which is defined by 12-membered rings of tetrahedrally coordinated atoms, intersecting with straight, highly elliptical channels, each of which is defined by 8-membered rings of tetrahedrally coordinated atoms. The 12-membered ring channels have cross-sectional dimensions between the bridging oxygen atoms of about 6.5 Angstroms by about 6.1 Angstroms, whereas the 8-membered ring channels have cross-sectional dimensions of about 1.2 Angstroms by about 5.0 Angstroms.

Variations in the X-ray diffraction pattern may occur between the different chemical composition forms of EMM-3. For example, the X-ray diffraction pattern of the as-synthesized AlPO form of EMM-3 is significantly different than that of the as-synthesized SAPO form. It is believed that the exact EMM-3 structure can vary due its particular composition and whether or not it has been calcined and rehydrated. While as synthesized and calcined/hydrated samples may have different X-ray diffraction patterns, the calcined/dehydrated forms have very similar diffraction patterns.

In the as-synthesized form AlPO-EMM-3 has a characteristic X-ray diffraction pattern, the essential lines of which are given in TABLE 2 measured with Cu Kα radiation using reflection geometry and a 1° divergence slit. The line intensities are referenced to the strongest line ($I_o$), in this case the first line at about 11.2 Å. Variations occur as a function of specific composition and its loading in the structure. For this reason the intensities and d-spacings are given as ranges.

TABLE 2

Most significant X-ray diffraction lines for as-synthesized AlPO-EMM-3

| d-spacing(Å) | $I/I_o$(%) |
|---|---|
| 11.5-10.9 | 80-100 |
| 11.1-10.6 | 5-50 |
| 9.62-9.22 | 5-50 |
| 6.56-6.37 | 5-50 |
| 5.44-5.31 | 20-60 |
| 5.35-5.23 | 30-70 |
| 4.78-4.68 | 5-50 |
| 4.30-4.21 | 5-50 |
| 4.23-4.15 | 50-80 |
| 4.10-4.02 | 30-70 |
| 4.04-3.97 | 50-80 |
| 3.99-3.92 | 20-60 |
| 3.88-3.81 | 5-40 |
| 3.26-3.21 | 20-60 |
| 2.822-2.788 | 20-60 |

In the as-synthesized form, SAPO-EMM-3 has a characteristic X-ray diffraction pattern, the essential lines of which are given in TABLE 3 measured with Cu Kα radiation using reflection geometry and a 1° divergence slit. As before the line intensities are referenced to the strongest line ($I_o$) in this case the line at about 4.0 Å. Variations occur as a function of specific composition and its loading in the structure. For this reason the intensities and d-spacings are given as ranges.

TABLE 3

Most significant X-ray diffraction lines for as-synthesized SAPO-EMM-3

| d-spacing(Å) | I/I$_o$(%) |
|---|---|
| 11.3-10.7 | 50-100 |
| 11.0-10.5 | 5-50 |
| 9.51-9.12 | 5-50 |
| 6.49-6.31 | 5-50 |
| 5.38-5.25 | 50-100 |
| 4.74-4.64 | 5-50 |
| 4.20-4.13 | 50-100 |
| 4.10-4.03 | 20-60 |
| 4.03-3.96 | 60-100 |
| 3.84-3.77 | 5-40 |
| 3.23-3.19 | 5-50 |

The EMM-3 material of the present invention may be calcined to remove the organic templating agent without loss of crystallinity. This is useful for activating the material for subsequent absorption of other guest molecules such as hydrocarbons. Upon calcination the structure of EMM-3 undergoes a change as indicated by the X-ray diffraction pattern. As mentioned above, if the calcined EMM-3 material is allowed to hydrate under ambient conditions the diffraction pattern is different from that measured when the calcined EMM-3 material is dehydrated. The essential lines, which uniquely define calcined/hydrated EMM-3 are listed in TABLE 4, and those essential lines uniquely defining calcined/dehydrated EMM-3 are listed in TABLE 5, measured with Cu Kα radiation using reflection geometry and a 1° divergence slit. As before, the line intensities are referenced to the strongest line (I$_o$), in the calcined/hydrated case the line at about 10.7 Å, and in the calcined/dehydrated case the first line at about 10.9 Å. Variations occur as a function of specific composition, temperature and the level of hydration in the structure. For this reason the intensities and d-spacings are given as ranges.

TABLE 4

Most significant X-ray diffraction lines for calcined/hydrated EMM-3

| d-spacing(Å) | I/I$_o$(%) |
|---|---|
| 11.6-11.0 | 5-40 |
| 10.9-10.4 | 80-100 |
| 9.29-8.91 | 5-40 |
| 6.55-6.36 | 20-60 |
| 6.36-6.18 | 5-40 |
| 4.61-4.52 | 5-50 |
| 4.28-4.20 | 20-60 |
| 4.18-4.11 | 5-50 |
| 4.04-3.97 | 5-40 |
| 4.01-3.94 | 40-80 |
| 3.71-3.65 | 5-50 |
| 3.30-3.26 | 20-60 |
| 3.25-3.21 | 20-60 |
| 3.16-3.12 | 5-50 |
| 3.06-3.02 | 5-50 |
| 2.964-2.926 | 5-40 |

TABLE 5

Most significant X-ray diffraction lines for calcined/dehydrated EMM-3

| d-spacing(Å) | I/I$_o$(%) |
|---|---|
| 11.2-10.6 | 80-100 |
| 9.48-9.09 | 5-40 |
| 6.53-6.34 | 5-40 |
| 6.42-6.24 | 5-40 |
| 5.52-5.39 | 1-20 |
| 4.70-4.60 | 5-40 |
| 4.19-4.11 | 5-40 |
| 4.16-4.08 | 1-20 |
| 4.02-3.95 | 5-40 |
| 3.19-3.15 | 1-20 |

In addition, to describing the structure of EMM-3 by the interconnections of the tetrahedral atoms as in TABLE 1 above, it may be defined by its unit cell, which is the smallest repeating unit containing all the structural elements of the material. The pore structure of EMM-3 is illustrated in FIG. 1 (which shows only the tetrahedral atoms) down the direction of the sinusoidal 12-membered ring channel. There are four unit cell units in FIG. 1, whose limits are defined by the four boxes. TABLE 6 lists the typical positions of each tetrahedral atom in the unit cell in units of Angstroms. Each tetrahedral atom is bonded to bridging atoms, which are also bonded to adjacent tetrahedral atoms. Tetrahedral atoms are those capable of having tetrahedral coordination, including one or more of, but not limiting, lithium, beryllium, boron, magnesium, aluminum, silicon, phosphorous, titanium, chromium, manganese, iron, cobalt, nickel, copper, zinc, zirconium, gallium, germanium, arsenic, indium, tin, and antimony. Bridging atoms are those capable of connecting two tetrahedral atoms, examples which include, but not limiting, oxygen, nitrogen, fluorine, sulfur, selenium, and carbon atoms.

In the case of oxygen, it is also possible that the bridging oxygen is also connected to a hydrogen atom to form a hydroxyl group (—OH—). In the case of carbon it is also possible that the carbon is also connected to two hydrogen atoms to form a methylene group (—CH$_2$—). For example, bridging methylene groups have been seen in the zirconium diphosphonate, MIL-57. See: C. Serre, G. Férey, *J. Mater. Chem.* 12, p. 2367 (2002). Bridging sulfur and selenium atoms have been seen in the UCR-20-23 family of microporous materials. See: N. Zheng, X. Bu, B. Wang, P. Feng, *Science* 298, p. 2366 (2002). Bridging fluorine atoms have been seen in lithium hydrazinium fluoroberyllate, which has the ABW structure type. See: M. R. Anderson, I. D. Brown, S. Vilminot, *Acta Cryst.* B29, p. 2626 (1973). Since tetrahedral atoms may move about due to other crystal forces (presence of inorganic or organic species, for example), or by the choice of tetrahedral and bridging atoms, a range of ±0.5 Angstrom is implied for the x and y coordinate positions and a range of ±1 Angstrom for the z coordinate positions.

TABLE 6

Positions of tetrahedral (T) atoms for the EMM-3 structure. Values, in units of Angstroms, are approximate and are typical when T = silicon and the bridging atoms are oxygen.

| Atom | X(Å) | y(Å) | z(Å) |
|---|---|---|---|
| T1 | 2.272 | 1.626 | 2.421 |
| T2 | 0.000 | 1.577 | 4.500 |
| T3 | 0.000 | 1.570 | 12.472 |

TABLE 6-continued

Positions of tetrahedral (T) atoms for the EMM-3 structure. Values, in units of Angstroms, are approximate and are typical when T = silicon and the bridging atoms are oxygen.

| Atom | X(Å) | y(Å) | z(Å) |
|---|---|---|---|
| T4 | 0.000 | 0.725 | 7.542 |
| T5 | 2.262 | 0.000 | 10.963 |
| T6 | 8.040 | 4.728 | 2.421 |
| T7 | 0.000 | 4.777 | 4.500 |
| T8 | 0.000 | 4.784 | 12.472 |
| T9 | 0.000 | 5.630 | 7.542 |
| T10 | 8.050 | 6.355 | 10.963 |
| T11 | 8.040 | 7.981 | 19.505 |
| T12 | 0.000 | 7.932 | 17.425 |
| T13 | 0.000 | 7.925 | 9.454 |
| T14 | 0.000 | 7.080 | 14.383 |
| T15 | 2.272 | 11.083 | 19.505 |
| T16 | 0.000 | 11.132 | 17.425 |
| T17 | 0.000 | 11.139 | 9.454 |
| T18 | 0.000 | 11.984 | 14.383 |
| T19 | 8.040 | 11.083 | 19.505 |
| T20 | 8.050 | 0.000 | 10.963 |
| T21 | 2.272 | 7.981 | 19.505 |
| T22 | 2.262 | 6.355 | 10.963 |
| T23 | 2.272 | 4.728 | 2.421 |
| T24 | 8.040 | 1.626 | 2.421 |
| T25 | 7.428 | 7.981 | 13.383 |
| T26 | 5.156 | 7.932 | 15.463 |
| T27 | 5.156 | 7.925 | 1.509 |
| T28 | 5.156 | 7.080 | 18.505 |
| T29 | 7.418 | 6.355 | 0.000 |
| T30 | 2.884 | 11.083 | 13.383 |
| T31 | 5.156 | 11.132 | 15.463 |
| T32 | 5.156 | 11.139 | 1.509 |
| T33 | 5.156 | 11.984 | 18.505 |
| T34 | 2.894 | 0.000 | 0.000 |
| T35 | 2.884 | 1.626 | 8.542 |
| T36 | 5.156 | 1.577 | 6.462 |
| T37 | 5.156 | 1.570 | 20.416 |
| T38 | 5.156 | 0.725 | 3.421 |
| T39 | 7.428 | 4.728 | 8.542 |
| T40 | 5.156 | 4.777 | 6.462 |
| T41 | 5.156 | 4.784 | 20.416 |
| T42 | 5.156 | 5.630 | 3.421 |
| T43 | 2.884 | 4.728 | 8.542 |
| T44 | 2.894 | 6.355 | 0.000 |
| T45 | 7.428 | 1.626 | 8.542 |
| T46 | 7.418 | 0.000 | 0.000 |
| T47 | 7.428 | 11.083 | 13.383 |
| T48 | 2.884 | 7.981 | 13.383 |

The complete structure of EMM-3 is built by connecting multiple unit cells as defined above in a fully-connected three-dimensional framework. The tetrahedral atoms in one unit cell are connected to certain tetrahedral atoms in all of its adjacent unit cells. While TABLE 1 lists the connections of all the tetrahedral atoms for a given unit cell of EMM-3, the connections may not be to the particular atom in the same unit cell but to an adjacent unit cell. For example, if the atoms listed in TABLE 1, have the particular coordinates as listed in TABLE 6, atom T4 is connected to atoms T2 and T35 in the same unit cell. The T4 connections to atoms T17 and T45, though, are to two adjacent unit cells. All of the connections listed in TABLE 1 are such that they are to the closest tetrahedral (T) atoms, regardless of whether they are in the same unit cell or in adjacent unit cells.

Although the Cartesian coordinates given in TABLE 6 may accurately reflect the positions of tetrahedral atoms in an idealized structure, the true structure can be more accurately described by the connectivity between the framework atoms as shown in TABLE 1 above. Another way to describe this connectivity is by the use of coordination sequences as applied to microporous frameworks by W. M. Meier and H. J. Moeck, in the *Journal of Solid State Chemistry* 27, p. 349 (1979). In a microporous framework, each tetrahedral atom, $N_0$, (T-atom) is connected to $N_1=4$ neighboring T-atoms through bridging atoms (typically oxygen). These neighboring T-atoms are then connected to $N_2$ T-atoms in the next shell. The $N_2$ atoms in the second shell are connected to $N_3$ T-atoms in the third shell, and so on. Each T-atom is only counted once, such that, for example, if a T-atom is in a 4-membered ring, at the fourth shell the $N_0$ atom is not counted second time, and so on. Using this methodology, a coordination sequence can be determined for each unique T-atom of a 4-connected net of T-atoms. The following line lists the maximum number of T-atoms for each shell.

$$N_0=1\ N_1 \leq 4\ N_2 \leq 12\ N_3 \leq 36\ N_k \leq 4\cdot 3^{k-1}$$

For a given T-atom in a 3-dimensional framework, there are six angles associated with connections to its 4 neighboring T-atoms. A way of indicating the size of the smallest ring associated with each of these six angles, called the vertex symbol, was developed by M. O'Keeffe and S. T. Hyde in *Zeolites* 19, p. 370 (1997). The order is such that opposite pairs of angles are grouped together. The vertex symbol $4.4.6.6.6_2.8$, for example, indicates that the first pair of opposite angles contains 4-rings, the second pair contains 6-rings, and the third pair contains two 6-rings and an 8-ring. It is recognized by the Structure Commission of the International Zeolite Association, that the combination of coordination sequence and vertex symbol together appear unique for a particular framework topology such that they can be used to unambiguously distinguish microporous frameworks of different types (see "Atlas of Zeolite Framework Types", Ch. Baerlocher, W. M. Meier, D. H. Olson, Elsevier, Amsterdam (2001). One way to determine the coordination sequence and vertex symbol for a given structure is from the atomic coordinates of the framework atoms using the computer program zeoTsites (see G. Sastre, J. D. Gale, *Microporous and mesoporous Materials* 43, p. 27 (2001).

The coordination sequence for the EMM-3 structure is given in TABLE 7. The T-atom connectivity as listed in TABLE 7 is for T-atoms only. Bridging atoms, such as oxygen usually connects the T-atoms. Although most of the T-atoms are connected to other T-atoms through bridging atoms, it is recognized that in a particular crystal of a material having a framework structure, it is possible that a number of T-atoms may not connected to one another. Reasons for non-connectivity include, but are not limited by, T-atoms located at the edges of the crystals and by defects sites caused by, for example, vacancies in the crystal. The framework listed in TABLE 7 is not limited in any way by its composition, unit cell dimensions or space group symmetry.

TABLE 7

Coordination sequences and vertex symbols for the EMM-3 structure

| Atom Number Symbol | Atom Label | Coordination Sequence | | | | | | | | Vertex | |
|---|---|---|---|---|---|---|---|---|---|---|---|
| 1 | T1 | 4 | 10 | 19 | 31 | 49 | 72 | 97 | 124 | 155 | 194 | $4.4.6.6.6_2.8$ |
| 2 | T2 | 4 | 10 | 20 | 32 | 48 | 71 | 98 | 126 | 155 | 192 | $4.6.4.6.6_2.8$ |
| 3 | T3 | 4 | 9 | 17 | 30 | 49 | 73 | 97 | 120 | 154 | 199 | $4.6.4.6.4.12_{26}$ |
| 4 | T4 | 4 | 10 | 19 | 31 | 51 | 73 | 93 | 123 | 157 | 195 | $4.6_2.4.6_2.6_2.12_{18}$ |
| 5 | T5 | 4 | 9 | 18 | 29 | 48 | 72 | 94 | 124 | 156 | 192 | $4.4.4.8.6_2.6_2$ |

While the idealized structure contains only 4-coordinate T-atoms, it is possible under certain conditions that some of the framework atoms may be 5- or 6-coordinate. This may occur, for example, under conditions of hydration when the composition of the material contains mainly phosphorous and aluminum T-atoms. When this occurs it is found that T-atoms may be also coordinated to one or two oxygen atoms of water molecules (—$OH_2$), or of hydroxyl groups (—OH). For example, the molecular sieve $AlPO_4$-34 is known to reversibly change the coordination of some aluminum T-atoms from 4-coordinate to 5- and 6-coordinate upon hydration as described by A. Tuel et al. in *J. Phys. Chem.* B 104, p. 5697 (2000). It is also possible that some framework T-atoms can be coordinated to fluoride atoms (—F) when materials are prepared in the presence of fluorine to make materials with 5-coordinate T-atoms as described by H. Koller in *J. Am. Chem Soc.* 121, p. 3368 (1999).

Figure 2:
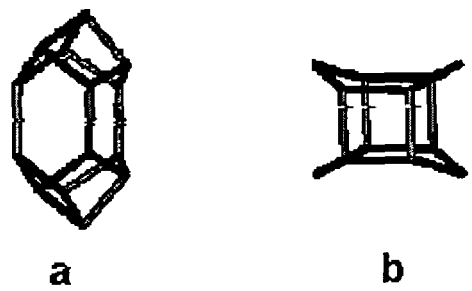
FIG. 2 shows the polyhedral subunits found in the structure of EMM-3. Only the tetrahedral atoms are shown.

Although the complete structure of EMM-3 is illustrated in FIG. 1, there are certain subunits unique to its structure. Subunits are certain smaller units of tetrahedral atoms that are located with in the unit cell of a particular structure. The complete structure of a given material can be looked as being built from a particular combination and connections of these subunits. Examples are double four rings, hexagonal prisms, and polyhedral cages such as sodalite, gmelinite and chabazite cages. Other examples include one-dimensional subunits such as chains, columns and tubes. Subunits of typical microporous materials are described in detail by S. Han and J. V. Smith in *Acta Cryst.* (1999), A55, pp. 332-382. The structure of EMM-3 consists of two subunits that have been seen in other framework materials (See FIG. 2). The subunit shown in FIG. 2a is also part of the MEI and BPH frameworks and has the face symbol $6^34^6$. These three letters codes are framework type codes as described by Ch. Baerlocher, W. M. Meier, and D. H. Olson in "Atlas of Zeolite Framework Types", 5th revised edition, Elsevier, New York (2001). The subunit as shown in FIG. 2b, having the face symbol $6^44^2$, is also part of the ATO, DFO, IFR, OSI, SAO frameworks.

Figure 3:
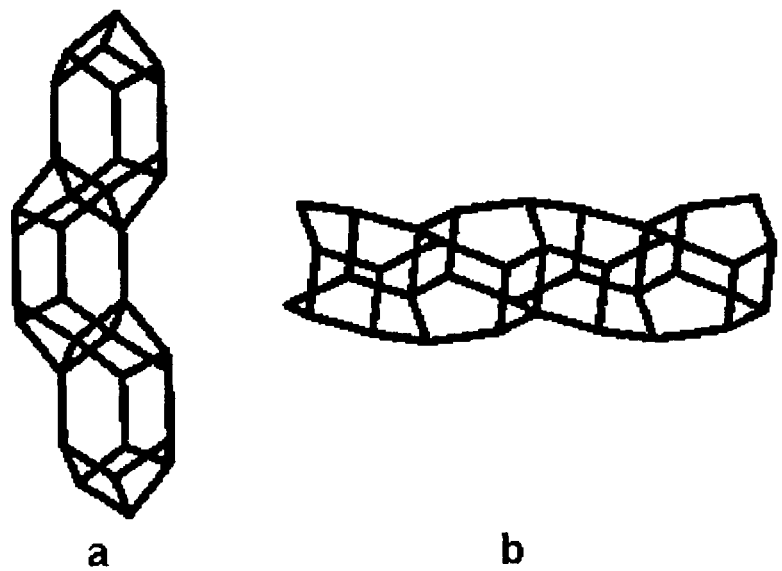
FIG. 3 shows the column subunits found in the structure of EMM-3, a: subunit 3a, b: subunit 3b. Only the tetrahedral atoms are shown.

In EMM-3 the two subunits, 2a and 2b are connected in way that is different from these other frameworks to form unique one-dimensional subunits of columns. These new columns of subunits are shown in FIG. 3.

TABLE 8 and TABLE 9 list the positions of each tetrahedral atom in subunits 3a and 3b in units of Angstroms. Each tetrahedral atom is bonded to bridging atoms, which are also bonded to adjacent tetrahedral atoms.

TABLE 8

Positions of tetrahedral (T) atoms for the basic EMM-3 subunit 3a. Values, in units of Angstroms, are approximate, have a range of ±0.5 Angstrom and are typical when T = silicon and the bridging atoms are oxygen.

| Atom | x(Å) | y(Å) | z(Å) |
|---|---|---|---|
| T1 | 4.051 | 2.356 | 6.961 |
| T2 | 3.430 | 3.983 | 9.381 |
| T3 | 3.430 | 7.084 | 9.381 |
| T4 | 4.051 | 15.067 | 6.961 |
| T5 | 4.051 | 8.711 | 6.961 |
| T6 | 3.430 | 13.440 | 4.541 |
| T7 | 3.430 | 10.338 | 4.541 |
| T8 | 6.313 | 0.785 | 8.468 |
| T9 | 6.313 | 3.926 | 5.453 |
| T10 | 6.313 | 3.080 | 10.381 |
| T11 | 6.313 | 7.141 | 5.453 |
| T12 | 6.313 | 7.987 | 10.381 |
| T13 | 8.576 | 2.356 | 6.961 |
| T14 | 9.197 | 7.084 | 9.381 |
| T15 | 9.197 | 3.983 | 9.381 |
| T16 | 6.313 | 10.282 | 8.468 |
| T17 | 6.313 | 9.436 | 3.540 |
| T18 | 8.576 | 8.711 | 6.961 |
| T19 | 6.313 | 13.496 | 8.468 |
| T20 | 6.313 | 14.343 | 3.540 |
| T21 | 6.313 | 16.638 | 5.453 |
| T22 | 8.576 | 15.067 | 6.961 |
| T23 | 9.197 | 10.338 | 4.541 |
| T24 | 9.197 | 13.440 | 4.541 |

TABLE 9

Positions of tetrahedral (T) atoms for the basic EMM-3 subunit 3b. Values, in units of Angstroms, are approximate, have a range of ±0.5 Angstrom and are typical when T = silicon and the bridging atoms are oxygen.

| Atom | x(Å) | y(Å) | z(Å) |
|---|---|---|---|
| T1 | 2.273 | 1.627 | 2.420 |
| T2 | 0.000 | 1.578 | 4.500 |
| T3 | 0.000 | 0.724 | 7.540 |
| T4 | 8.040 | 4.729 | 2.420 |
| T5 | 0.000 | 4.777 | 4.500 |
| T6 | 0.000 | 5.631 | 7.540 |
| T7 | 2.273 | 4.729 | 2.420 |
| T8 | 8.040 | 1.627 | 2.420 |
| T9 | 2.883 | 1.627 | 8.541 |
| T10 | 5.157 | 1.578 | 6.460 |
| T11 | 5.157 | 0.724 | 3.420 |
| T12 | 7.430 | 4.729 | 8.541 |
| T13 | 5.157 | 4.777 | 6.460 |
| T14 | 5.157 | 5.631 | 3.420 |
| T15 | 2.883 | 4.729 | 8.541 |
| T16 | 7.430 | 1.627 | 8.541 |

The invention also includes a method of synthesizing a crystalline aluminophosphate or metalloaluminophosphate composition of EMM-3 having the diffraction pattern similar to TABLE 2 or TABLE 3, by mixing together a source of alumina, phosphorous, organic directing agent (R), water, and optional metal (Me), with a composition, in terms of mole ratios, within the following ranges:

| | |
|---|---|
| $P_2O_5/Al_2O_3$ | 0.5-2 |
| $R/Al_2O_3$ | 0.1-4 |
| $H_2O/Al_2O_3$ | 20-1000 |
| $Me/Al_2O_3$ | 0-2 | and preferably within the following ranges:

| | |
|---|---|
| $P_2O_5/Al_2O_3$ | 0.9-1.1 |
| $R/Al_2O_3$ | 0.3-1.0 |
| $H_2O/Al_2O_3$ | 30-80 |
| $Me/Al_2O_3$ | 0-.6 |

Me is one or more of B, Ga, Si, Ge, Zn, Mg, Fe, Co, Ni, Be, Mn, Ti, Zr.

Said organic directing agent is preferably hexamethonium dihydroxide, where hexamethonium is N,N,N,N',N',N'-hexamethyl-1,6-hexanediammonium. Sources of aluminum can be hydrated alumina, pseudo-boehmite, colloidal alumina and aluminum hydroxides. Sources of phosphorous can be phosphoric acid and ammonium phosphates. Sources of metal can be organic silicon such as tetraethyhlorthosilicate, germanium(IV) ethoxide, colloidal silica, silica gel, fumed silica and various salts of the metals (Me) such as zinc nitrate, cobalt acetate, iron chloride, and magnesium nitrate, etc. The mixture is then heated at a temperature and time sufficient to crystallize the aluminophosphate or metalloaluminophosphate The crystalline material of this invention can be used to catalyze a wide variety of chemical conversion processes, particularly organic compound conversion processes, including many of present commercial/industrial importance. Examples of chemical conversion processes which are effectively catalyzed by the crystalline material of this invention, by itself or in combination with one or more other catalytically active substances including other crystalline catalysts, include those requiring a catalyst with acid activity.

Thus, in its active form EMM-3 exhibits a high acid activity, with an alpha value of 1 to 12. Alpha value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec−1). The Alpha Test is described in U.S. Pat. No. 3,354,078; in the *Journal of Catalysis* 4, 527 (1965); 6, 278 (1966); and 61, 395 (1980), each incorporated herein by reference as to that description. The experimental conditions of the test used herein include a constant temperature of 538° C. and a variable flow rate as described in detail in the *Journal of Catalysis* 61, 395 (1980).

When used as a catalyst, the crystalline material of the invention may be subjected to treatment to remove part or all of any organic constituent. This is conveniently effected by thermal treatment in which the as-synthesized material is heated at a temperature of at least about 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product, especially in its metal, hydrogen and ammonium forms, is particularly useful in the catalysis of certain organic, e.g., hydrocarbon, conversion reactions.

When used as a catalyst, the crystalline material can be intimately combined with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be in the composition by way of cocrystallization, exchanged into the composition to the extent a Group IIIA element, e.g., aluminum, is in the structure, impregnated therein or intimately physically admixed therewith. Such component can be impregnated in or on to it such as, for example, by, in the case of platinum, treating EMM-3 with a solution containing a platinum metal-containing ion. Thus, suitable platinum compounds for this purpose include chloroplatinic acid, platinous chloride and various compounds containing the platinum amine complex.

The crystalline material of this invention, when employed either as an adsorbent or as a catalyst in an organic compound conversion process should be dehydrated, at least partially. This can be done by heating to a temperature in the range of 100° C. to about 370° C. in an atmosphere such as air, nitrogen, etc., and at atmospheric, subatmospheric or superatmospheric pressures for between 30 minutes and 48 hours. Dehydration can also be performed at room temperature merely by placing the EMM-3 in a vacuum, but a longer time is required to obtain a sufficient amount of dehydration.

As in the case of many catalysts, it may be desirable to incorporate the new crystal with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the new crystal, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, such as silica, zirconia, titania, magnesia, beryllia, alumina, and mixtures thereof.

In addition to the foregoing materials, the new crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented.

EXAMPLES

Example 1

Synthesis of AlPO EMM-3

Figure 4:
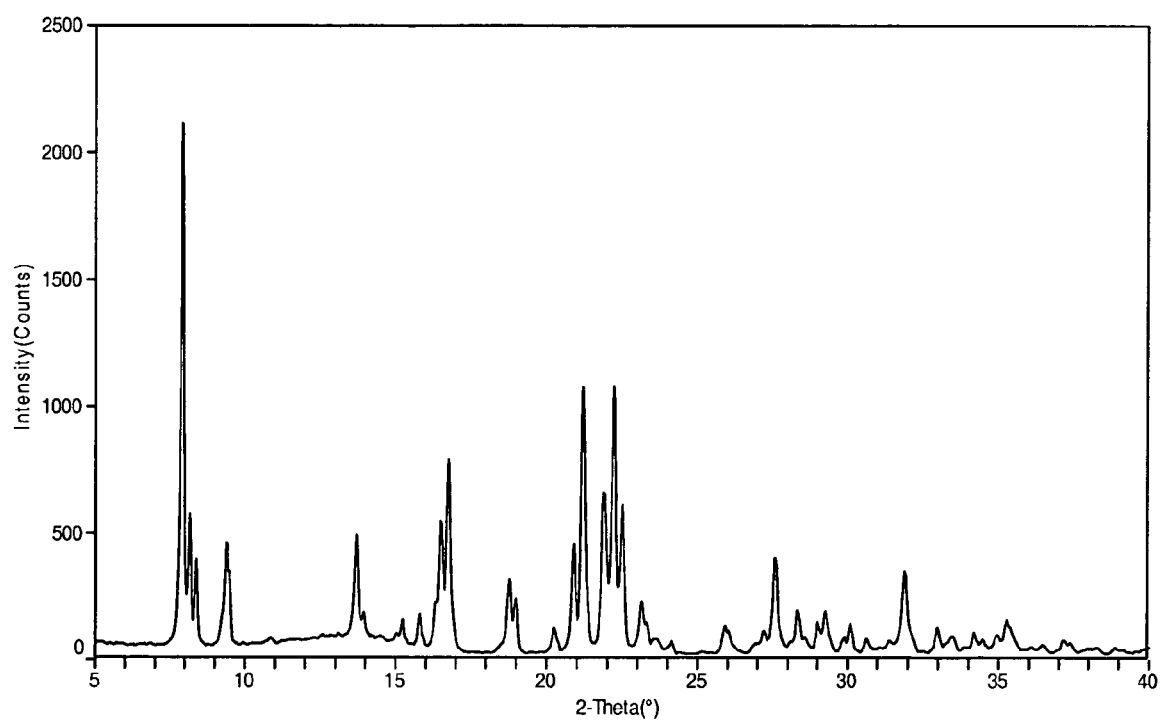
FIG. 4 shows the X-ray diffraction pattern of AlPO-EMM-3, from Example 1.

A synthesis gel of composition:

$$0.5R(OH)_2:Al_2O_3:P_2O_5:45H_2O,$$

where R is N,N,N,N',N',N'-hexamethyl-1,6-hexanediammonium (hexamethonium) was prepared by adding 49.2 g of 85% $H_3PO_4$, 50 g $H_2O$, and 29.4 g hydrated alumina (Condea/Vista Catapal A, 26% $H_2O$) to a tared plastic beaker. The mixture was mixed with a spatula for one minute and the resulting thick paste allowed to age for five minutes. The mixture was again mixed for one minute with a spatula. To this mixture, 114.5 g of 22% hexamethonium dihydroxide and 6.9 g $H_2O$ were added and the mixture mixed for one minute with a spatula, transferred to a blender and then thoroughly homogenized for five minutes. The white gel was then divided between a Teflon-lined autoclave and a 300 ml stirred stainless steel autoclave. The Teflon-lined autoclave was reacted at 160° C. for 20 hours in an air oven under static conditions and the stainless steel autoclave was reacted at 160° C. for 20 hours with a stirring speed of 250 rpm. After cooling the autoclaves to room temperature the products were recovered by centrifugation, and then reslurried with de-ionized $H_2O$ and centrifuged four more times to wash the product. The products were dried in an air oven at 115° C. and then analyzed by powder X-ray diffraction and found to be pure EMM-3 as shown in TABLE 10 and FIG. 4.

TABLE 10

X-ray diffraction listing of AlPO EMM-3 as synthesized.
Siemens D5000 diffractometer using CuKα radiation.

| 2-theta | d(Å) | I/Io(%) |
|---|---|---|
| 7.91 | 11.2 | 100 |
| 8.16 | 10.8 | 20 |
| 8.38 | 10.5 | 13 |
| 9.38 | 9.42 | 22 |
| 9.49 | 9.31 | 7 |
| 10.86 | 8.14 | 2 |
| 13.69 | 6.46 | 24 |

TABLE 10-continued

X-ray diffraction listing of AlPO EMM-3 as synthesized.
Siemens D5000 diffractometer using CuKα radiation.

| 2-theta | d(Å) | I/Io(%) |
|---|---|---|
| 13.94 | 6.35 | 4 |
| 15.02 | 5.89 | 2 |
| 15.22 | 5.82 | 3 |
| 15.79 | 5.61 | 6 |
| 16.31 | 5.43 | 6 |
| 16.49 | 5.37 | 30 |
| 16.75 | 5.29 | 44 |
| 18.75 | 4.728 | 21 |
| 18.98 | 4.672 | 9 |
| 20.23 | 4.385 | 7 |
| 20.86 | 4.255 | 23 |
| 21.18 | 4.192 | 66 |
| 21.87 | 4.061 | 47 |
| 22.19 | 4.003 | 67 |
| 22.48 | 3.952 | 32 |
| 23.11 | 3.845 | 16 |
| 23.31 | 3.813 | 3 |
| 23.60 | 3.767 | 5 |
| 24.10 | 3.689 | 2 |
| 25.87 | 3.441 | 7 |
| 26.02 | 3.421 | 7 |
| 26.90 | 3.312 | 4 |
| 27.18 | 3.278 | 5 |
| 27.56 | 3.234 | 33 |
| 28.33 | 3.147 | 12 |
| 28.60 | 3.119 | 2 |
| 28.99 | 3.078 | 5 |
| 29.25 | 3.051 | 13 |
| 29.87 | 2.989 | 3 |
| 30.09 | 2.968 | 6 |
| 30.63 | 2.916 | 3 |
| 31.35 | 2.851 | 5 |
| 31.88 | 2.805 | 32 |
| 32.96 | 2.715 | 7 |
| 33.42 | 2.679 | 10 |
| 34.17 | 2.622 | 4 |
| 34.45 | 2.601 | 3 |
| 34.93 | 2.567 | 4 |
| 35.24 | 2.545 | 4 |
| 35.37 | 2.536 | 9 |
| 36.43 | 2.464 | 1 |
| 37.15 | 2.419 | 3 |
| 37.37 | 2.404 | 1 |
| 38.88 | 2.314 | 1 |
| 40.15 | 2.244 | 6 |
| 41.49 | 2.175 | 6 |

Example 2

Calcination of EMM-3

Figure 5:
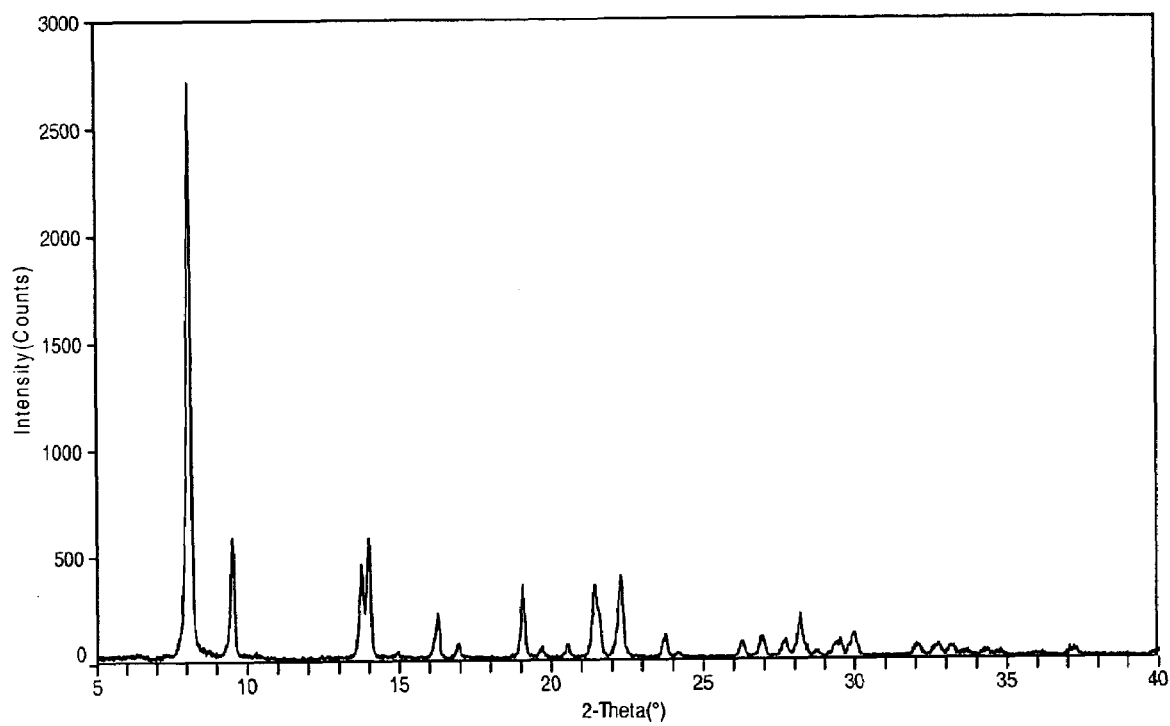
FIG. 5 shows the X-ray diffraction pattern of AlPO-EMM-3, calcined/dehydrated from Example 2.

A portion of the sample from example 1 was calcined in air by ramping to 650° C. in 2 hours and then holding for 2 hours. One portion of this calcined sample was mounted on a platinum heating strip in a high temperature X-ray diffraction chamber mounted on a Scintag XDS 2000 diffractometer. The sample temperature was set to 150° C. and the chamber was purged with a flow of dry nitrogen. The X-ray diffraction pattern was then measured and is given in TABLE 11 and shown in FIG. 5.

TABLE 11

X-ray diffraction listing of calcined, dehydrated EMM-3.
Scintag XDS 2000 diffractometer using CuKα radiation.

| 2-theta | D(Å) | I/I$_o$(%) |
|---|---|---|
| 8.10 | 10.9 | 100 |
| 9.52 | 9.28 | 18 |
| 13.76 | 6.43 | 13 |
| 13.99 | 6.33 | 19 |
| 14.93 | 5.93 | 1 |
| 16.24 | 5.45 | 7 |
| 16.94 | 5.23 | 2 |
| 19.06 | 4.652 | 11 |
| 19.68 | 4.507 | 2 |
| 20.53 | 4.322 | 2 |
| 21.41 | 4.147 | 10 |
| 21.55 | 4.120 | 7 |
| 22.27 | 3.988 | 17 |
| 23.74 | 3.746 | 4 |
| 24.17 | 3.679 | 1 |
| 26.25 | 3.393 | 3 |
| 26.91 | 3.311 | 4 |
| 27.63 | 3.226 | 3 |
| 27.71 | 3.216 | 0 |
| 28.15 | 3.167 | 9 |
| 29.35 | 3.041 | 3 |
| 29.52 | 3.024 | 1 |
| 29.78 | 2.998 | 1 |
| 29.94 | 2.982 | 5 |
| 32.02 | 2.793 | 2 |
| 32.68 | 2.738 | 3 |
| 33.15 | 2.701 | 2 |
| 37.06 | 2.424 | 1 |
| 37.24 | 2.413 | 1 |

Figure 6:
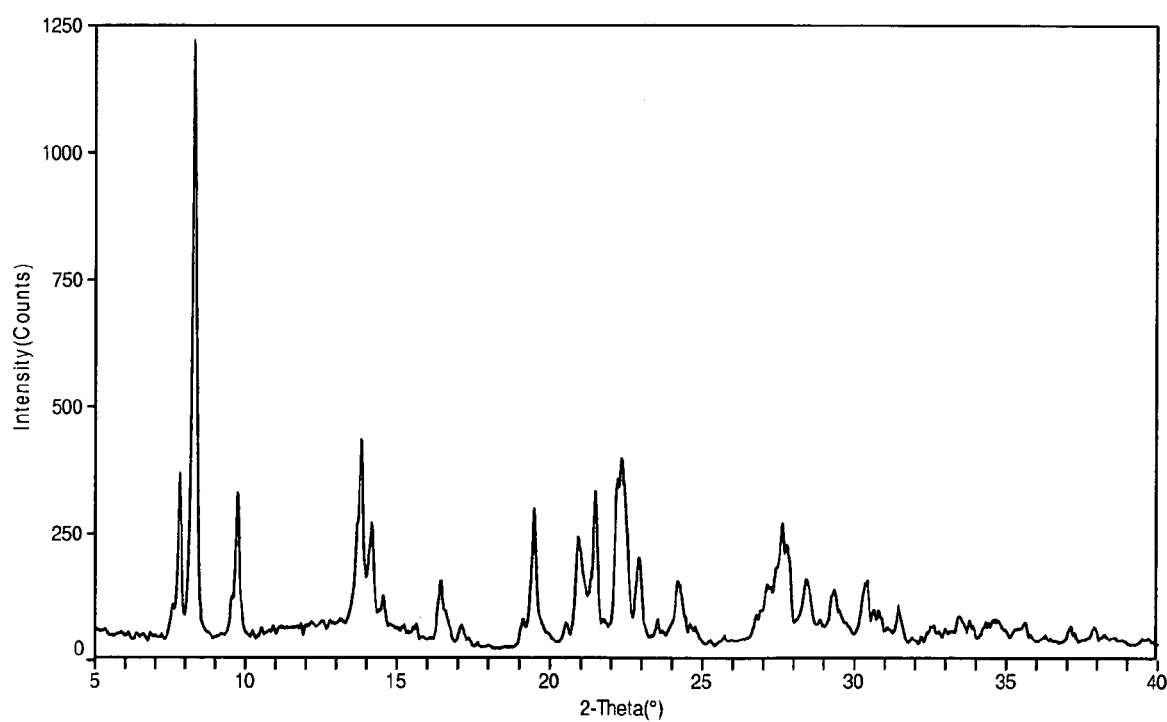
FIG. 6 shows the X-ray diffraction pattern of AlPO-EMM-3, calcined/hydrated from Example 2.

Another portion of this calcined sample was allowed to hydrate under ambient conditions at room temperature for several hours. The X-ray diffraction pattern was then measured with Cu Kα radiation and is given in TABLE 12 and shown in FIG. 6.

TABLE 12

X-ray diffraction listing of calcined, hydrated EMM-3.
Siemens D5000 diffractometer using CuKα radiation.

| 2-theta | d(Å) | I/Io(%) |
|---|---|---|
| 7.58 | 11.7 | 4 |
| 7.81 | 11.3 | 19 |
| 8.29 | 10.7 | 100 |
| 9.71 | 9.10 | 18 |
| 9.72 | 9.09 | 7 |
| 13.71 | 6.45 | 36 |
| 13.81 | 6.41 | 10 |
| 14.12 | 6.27 | 15 |
| 14.52 | 6.09 | 4 |
| 16.40 | 5.40 | 10 |
| 16.62 | 5.33 | 2 |
| 17.10 | 5.18 | 3 |
| 19.09 | 4.65 | 4 |
| 19.45 | 4.56 | 29 |
| 20.48 | 4.33 | 1 |
| 20.93 | 4.24 | 38 |
| 21.43 | 4.14 | 25 |
| 22.16 | 4.01 | 19 |
| 22.34 | 3.976 | 53 |
| 22.89 | 3.883 | 15 |
| 23.52 | 3.780 | 3 |
| 24.19 | 3.676 | 23 |
| 24.70 | 3.601 | 3 |
| 26.75 | 3.330 | 2 |
| 27.17 | 3.280 | 30 |
| 27.59 | 3.230 | 32 |
| 27.80 | 3.207 | 7 |
| 28.41 | 3.139 | 22 |
| 29.33 | 3.043 | 25 |
| 30.33 | 2.945 | 17 |
| 30.80 | 2.901 | 10 |
| 31.42 | 2.845 | 6 |

Example 3

Synthesis of SAPO EMM-3

A synthesis gel of composition:

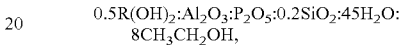
$$0.5R(OH)_2:Al_2O_3:P_2O_5:0.2SiO_2:45H_2O:8CH_3CH_2OH,$$

where R is N,N,N,N',N',N'-hexamethyl-1,6-hexanediammonium (hexamethonium) was prepared by adding 10.92 g of 85% $H_3PO_4$, 12.0 g $H_2O$, and 6.54 g hydrated alumina (Condea/Vista Catapal A, 26% $H_2O$) to a tared plastic beaker. The mixture was mixed with a spatula for one minute and the resulting thick paste allowed to age for five minutes. The mixture was again mixed for one minute with a spatula. To this mixture, 1.97 g of 98% tetraethylorthosilicate (Aldrich), 25.45 g of 22% hexamethonium dihydroxide (SACHEM, Inc.) and 17.46 g of 200 proof ethanol were added and the mixture mixed for one minute with a spatula, then added 1.00 g of AlPO EMM-3 seeds and 0.65 g $H_2O$ and the mixture mixed for one minute with a spatula, then transferred to a blender and thoroughly homogenized for five minutes. The white gel was then placed in a Teflon-lined autoclave and reacted at 160° C. for 48 hours in an air oven. After cooling the autoclave to room temperature the product was recovered by centrifugation, and then reslurried with de-ionized $H_2O$ and centrifuged four more times to wash the product. The product was dried in an air oven at 115° C. and then analyzed by powder X-ray diffraction and found to be pure EMM-3. Elemental analysis gave 1.40% Si, 17.0% Al, and 17.8% P representing a product stoichiometry of:

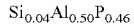
$$Si_{0.04}Al_{0.50}P_{0.46}$$

A portion of this sample was calcined in air at 650° C. for 3 hours and then found to absorb 11.1% n-hexane at 50 torr pressure, 24° C.

Example 4

Synthesis of SAPO EMM-3

A synthesis gel of composition:

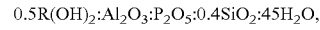
$$0.5R(OH)_2:Al_2O_3:P_2O_5:0.4SiO_2:45H_2O,$$

where R is N,N,N,N',N',N'-hexamethyl-1,6-hexanediammonium (hexamethonium) was prepared by adding 13.77 g of 85% $H_3PO_4$, 15.0 g $H_2O$, and 8.24 g hydrated alumina (Condea/Vista Catapal A, 26% $H_2O$) to a tared plastic beaker. The mixture was mixed with a spatula for one minute and the resulting thick paste allowed to age for five minutes. The mixture was again mixed for one minute with a spatula. To this mixture, 4.98 g of 98% tetraethylorthosilicate (Aldrich), 32.08 g of 22% hexamethonium dihydroxide (SA- CHEM, Inc.) were added and the mixture mixed for one minute with a spatula, then added 1.00 g of AlPO EMM-3 seeds and 0.94 g H$_2$O and the mixture mixed for one minute with a spatula, then transferred to a blender and thoroughly homogenized for five minutes. The white gel was then placed in a Teflon-lined autoclave and reacted at 160° C. for 48 hours in an air oven. After cooling the autoclave to room temperature the product was recovered by centrifugation, and then reslurried with de-ionized H$_2$O and centrifuged four more times to wash the product. The product was dried in an air oven at 115° C. and then analyzed by powder X-ray diffraction and found to be pure EMM-3. Elemental analysis gave 2.5% Si, 17.1% Al, and 18.0% P representing a product stoichiometry of:

$$Si_{0.068}Al_{0.486}P_{0.446}$$

A portion of this sample was calcined in air at 650° C. for 3 hours and then found to absorb 12.3% n-hexane at 50 torr pressure, 23° C.

Example 5

Synthesis of SAPO EMM-3

A synthesis gel of composition:

$$0.5R(OH)_2:Al_2O_3:P_2O_5:0.2SiO_2:45H_2O,$$

where R is N,N,N,N',N',N'-hexamethyl-1,6-hexanediammonium (hexamethonium) was prepared by adding 14.24 g of 85% H$_3$PO$_4$, 15.0 g H$_2$O, and 8.52 g hydrated alumina (Condea/Vista Catapal A, 26% H$_2$O) to a tared plastic beaker. The mixture was mixed with a spatula for one minute and the resulting thick paste allowed to age for five minutes. The mixture was again mixed for one minute with a spatula. To this mixture, 2.57 g of 98% tetraethylorthosilicate (Aldrich), 33.18 g of 22% hexamethonium dihydroxide (SA-CHEM, Inc.) were added and the mixture mixed for one minute with a spatula, then added 1.00 g of AlPO EMM-3 seeds and 1.49 g H$_2$O and the mixture mixed for one minute with a spatula, then transferred to a blender and thoroughly homogenized for five minutes. The white gel was then placed in a Teflon-lined autoclave and reacted at 160° C. for 48 hours in an air oven. After cooling the autoclave to room temperature the product was recovered by centrifugation, and then reslurried with de-ionized H$_2$O and centrifuged four more times to wash the product. The product was dried in an air oven at 115° C. and then analyzed by powder X-ray diffraction and found to be pure EMM-3. Elemental analysis gave 1.2% Si, 17.5% Al, and 19.4% P representing a product stoichiometry of:

$$Si_{0.032}Al_{0.492}P_{0.475}$$

A portion of this sample was calcined in air at 650° C. for 3 hours and then found to absorb 11.7% n-hexane at 50 torr pressure, 24° C.

Example 6

Synthesis of SAPO EMM-3

Figure 7:
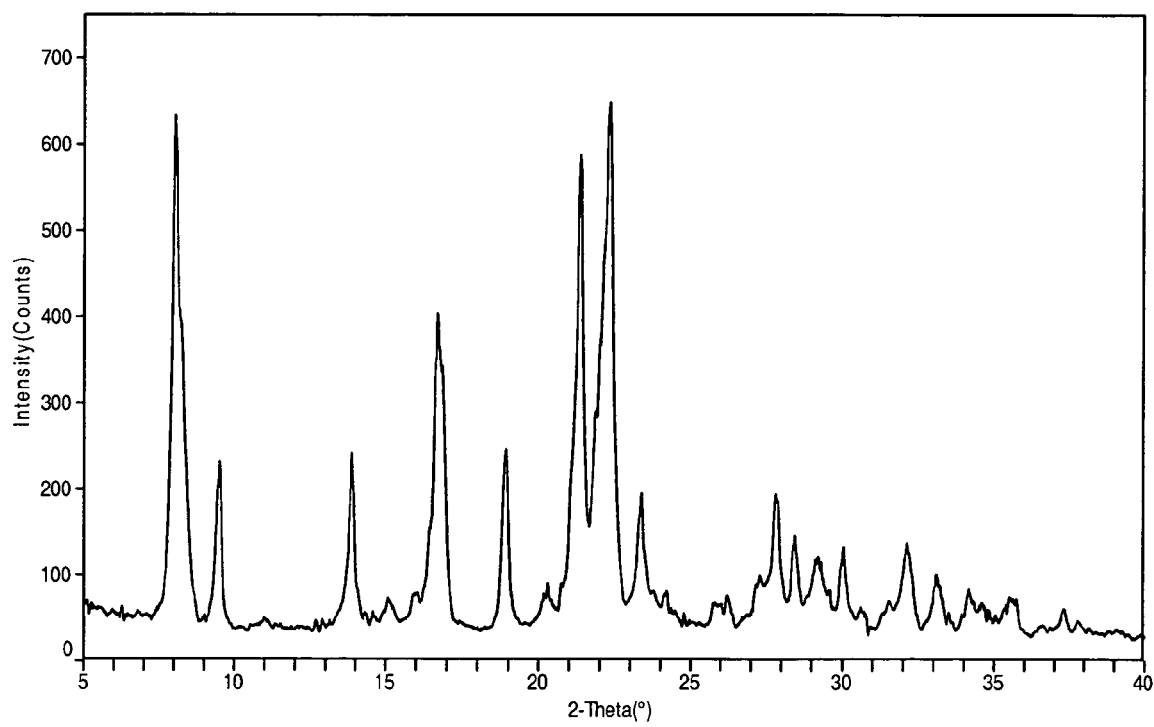
FIG. 7 shows the X-ray diffraction pattern of SAPO EMM-3 as prepared in Example 6.

A synthesis gel of composition:

$$0.5R(OH)_2:Al_2O_3:P_2O_5:0.4SiO_2:45H_2O,$$

where R is N,N,N,N',N',N'-hexamethyl-1,6-hexanediammonium (hexamethonium) was prepared by adding 33.67 g of 22% hexamethonium dihydroxide (SACHEM) and 1.67 g fumed silica to 125 ml Teflon bottle, shaken and then placed in a 100° C. oven for 3 hours. 14.45 g of 85% H$_3$PO$_4$, 12.44 g H$_2$O, and 8.65 g hydrated alumina (Condea/Vista Catapal A, 26% H$_2$O) was added to a tared plastic beaker. The mixture was mixed with a spatula for one minute and the resulting thick paste allowed to age for five minutes. The mixture was again mixed for one minute with a spatula. To this mixture, the template solution was added along with 1.00 g of AlPO EMM-3 seeds and 4.12 g H$_2$O and the mixture mixed for one minute with a spatula, then transferred to a blender and thoroughly homogenized for five minutes. The white gel was then placed in a Teflon-lined autoclave and reacted at 160° C. for 48 hours in an air oven. After cooling the autoclave to room temperature the product was recovered by centrifugation, and then reslurried with de-ionized H$_2$O and centrifuged four more times to wash the product. The product was dried in an air oven at 115° C. and then analyzed by powder X-ray diffraction and found to be pure EMM-3 as given in TABLE 13 and FIG. 7. Elemental analysis gave 2.6% Si, 17.2% Al, and 17.0% P representing a product stoichiometry of:

$$Si_{0.072}Al_{0.498}P_{0.429}$$

A portion of this sample was calcined in air at 650° C. for 3 hours and then found to absorb 12.5% n-hexane at 59 torr pressure, 23° C.

TABLE 13

X-ray diffraction listing of SAPO EMM-3 as prepared - example 6. Siemens D5000 diffractometer using CuKα radiation

| 2-theta | d(Å) | I/I$_o$(%) |
| --- | --- | --- |
| 8.02 | 11.0 | 81 |
| 8.29 | 10.7 | 34 |
| 9.47 | 9.34 | 24 |
| 13.88 | 6.38 | 24 |
| 15.13 | 5.85 | 4 |
| 16.76 | 5.28 | 77 |
| 18.91 | 4.69 | 26 |
| 21.35 | 4.16 | 81 |
| 21.94 | 4.05 | 31 |
| 22.30 | 3.984 | 100 |
| 22.51 | 3.947 | 12 |
| 23.39 | 3.799 | 19 |
| 25.81 | 3.450 | 5 |
| 26.20 | 3.399 | 2 |
| 27.30 | 3.264 | 9 |
| 27.79 | 3.208 | 19 |
| 28.40 | 3.140 | 10 |
| 29.15 | 3.061 | 16 |
| 29.98 | 2.978 | 8 |
| 31.54 | 2.834 | 5 |
| 32.12 | 2.785 | 17 |
| 33.11 | 2.703 | 10 |
| 34.14 | 2.624 | 2 |
| 34.48 | 2.599 | 11 |
| 35.54 | 2.524 | 7 |

Example 7

Synthesis of GeAPO EMM-3

A synthesis gel of composition:

$$0.5R(OH)_2:Al_2O_3:P_2O_5:0.2GeO_2:45H_2O,$$

where R is N,N,N,N',N',N'-hexamethyl-1,6-hexanediammonium (hexamethonium) was prepared by adding 14.1 g of 85% H$_3$PO$_4$, 16.4 g H$_2$O, and 8.46 g hydrated alumina (Condea/Vista Catapal A, 26% H$_2$O) to a tared plastic beaker. The mixture was mixed with a spatula for one minute and the resulting thick paste allowed to age for five minutes. The mixture was again mixed for one minute with a spatula. To this mixture, 3.1 g germanium(IV) ethoxide and 32.9 g of 22% hexamethonium dihydroxide (SACHEM, Inc.) were added and the mixture mixed for one minute with a spatula, transferred to a blender and then thoroughly homogenized for five minutes. The white gel was then placed in Teflon-lined autoclave and reacted at 160° C. for 26 hours. After cooling the autoclave to room temperature the product was recovered by centrifugation, and then reslurried with de-ionized $H_2O$ and centrifuged four more times to wash the product. The product was dried in an air oven at 115° C. and then analyzed by powder X-ray diffraction and found to be pure GeAPO EMM-3.

Example 8

Synthesis of ZnAPO EMM-3

A synthesis gel of composition:

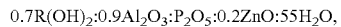

$0.7R(OH)_2:0.9Al_2O_3:P_2O_5:0.2ZnO:55H_2O$, where R is N,N,N,N',N',N'-hexamethyl-1,6-hexanediammonium (hexamethonium) was prepared by adding 24.2 g of 85% $H_3PO_4$, 25 g $H_2O$, and 6.3 g $Zn(NO_3)_2.6H_2O$ to a tared plastic beaker and stirring until zinc nitrate dissolved. Then 13.0 g hydrated alumina (Condea/Vista Catapal A, 26% $H_2O$) was added and the mixture was mixed with a spatula for one minute and the resulting thick paste allowed to age for five minutes. The mixture was again mixed for one minute with a spatula. To this mixture 79.0 g of 22% hexamethonium dihydroxide (SACHEM, Inc.) was added and the mixture mixed for one minute with a spatula, transferred to a blender and then thoroughly homogenized for five minutes. The white gel was then placed in Teflon-lined autoclaves and reacted at 130° C. 1 day in air oven. After cooling the autoclaves to room temperature the product was recovered by centrifugation, and then reslurried with de-ionized $H_2O$ and centrifuged four more times to wash the product. The product was dried in an air oven at 115° C. and then analyzed by powder X-ray diffraction and found to be impure EMM-3.

Example 9

Synthesis of MgAPO EMM-3

A synthesis gel of composition:

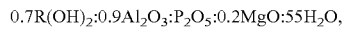

$0.7R(OH)_2:0.9Al_2O_3:P_2O_5:0.2MgO:55H_2O$, where R is N,N,N,N',N',N'-hexamethyl-1,6-hexanediammonium (hexamethonium) was prepared by adding 24.4 g of 85% $H_3PO_4$, 25 g $H_2O$, and 5.4 g $Mg(NO_3)_2.6H_2O$ to a tared plastic beaker and stirring until magnesium nitrate dissolved. Then 13.1 g hydrated alumina (Condea/Vista Catapal A, 26% $H_2O$) was added and the mixture was mixed with a spatula for one minute and the resulting thick paste allowed to age for five minutes. The mixture was again mixed for one minute with a spatula. To this mixture 79.5 g of 22% hexamethonium dihydroxide (SACHEM, Inc.) was added and the mixture mixed for one minute with a spatula, transferred to a blender and then thoroughly homogenized for five minutes. The white gel was then placed in Teflon-lined autoclaves and reacted at 130° C. 1 day in air oven. After cooling the autoclaves to room temperature the product was recovered by centrifugation, and then reslurried with de-ionized $H_2O$ and centrifuged four more times to wash the product. The product was dried in an air oven at 115° C. and then analyzed by powder X-ray diffraction and found to be impure, but the major phase to be EMM-3.

Example 10

Catalytic Activity of EMM-3

The SAPO-EMM-3 products from Examples 3, 4, 5, and 6 were calcined in air at 650° C. for three hours to remove the organic template. The calcined samples were then pressed into a pellet, crushed and then sieved to 14-24 mesh size. These sieved samples were then subject to the alpha test as described above. The results are give below and demonstrate the ability of EMM-3 to convert hydrocarbons.

| Sample | alpha |
|---|---|
| Example 3 | 1 |
| Example 4 | 6 |
| Example 5 | 6 |
| Example 6 | 12 |

What is claimed is:

1. A synthetic crystalline material having a framework of tetrahedral atoms (T) connected by bridging atoms, the tetrahedral atom framework being defined by connecting the nearest tetrahedral (T) atoms in the manner shown in TABLE 1 of the specification.

2. The crystalline material of claim 1 wherein said tetrahedral atoms include one or more elements selected from the group consisting of Be, Li, Al, P, Si, Ga, Ge, Zn, Cr, Mg, Fe, Co, Ni, Be, Mn, As, In, Sn, Sb, Ti, and Zr.

3. The crystalline material of claim 1 wherein said bridging atoms include one or more elements selected from the group consisting of O, N, F, S, Se, and C.

4. A process for the separation of hydrocarbons from a hydrocarbon containing stream using a form of the synthetic porous crystalline material of claim 1.

5. A process for converting a feedstock comprising organic compounds to conversion product(s) which comprises contacting said feedstock at organic compound conversion conditions with a catalyst comprising an active form of the synthetic porous crystalline material of claim 1.

6. A synthetic porous crystalline material characterized in as-synthesized form by an X-ray diffraction pattern including the lines substantially as set forth in TABLE 2 of the specification.

7. A synthetic porous crystalline material characterized in as-synthesized form by an X-ray diffraction pattern including the lines substantially as set forth in TABLE 3 of the specification.

8. A synthetic porous crystalline material, characterized in calcined form by an x-ray diffraction pattern including the lines substantially as set forth in TABLE 4 of the specification.

9. A synthetic porous crystalline material, characterized in calcined form by an x-ray diffraction pattern including the lines substantially as set forth in TABLE 5 of the specification.

10. A new crystalline aluminophosphate compound of composition $R_mAl_yP_zO_4.nH_2O$ where R is an organic compound, where m=0.01-1, y=0.6-1.2, z=0.6-1.2 and n=1-10 and having a unique diffraction pattern as given in TABLE 2.

11. The crystalline material of claim 10 wherein R comprises a cation derived from hexamethonium.

12. A new crystalline metalloaluminophosphate compound of composition $R_mMe_xAl_yP_zO_4 \cdot nH_2O$ where R is an organic compound, Me is one or more of B, Ga, Si, Ge, Zn, Mg, Fe, Co, Ni, Be, Mn, Ti, Zr, and where m=0.01-1, x=0.01-0.2, y=0.6-1.2, z=0.6-1.2 and n>0.2, and having a unique diffraction pattern as given TABLE 3.

13. The crystalline material of claim 12 wherein R comprises a cation derived from hexamethonium.

14. A calcined crystalline metalloaluminophosphate compound of composition $Me_xAl_yP_zO_4 \cdot nH_2O$ where Me is one or more of B, Ga, Si, Ge, Zn, Mg, Fe, Co, Ni, Be, Mn, Ti, Zr, and where x=0.00-0.2, y=0.6-1.2, z=0.6-1.2 and n>0.2, and having a unique diffraction pattern as given TABLE 4.

15. A calcined crystalline metalloaluminophosphate compound of composition $Me_xAl_yP_zO_4 \cdot nH_2O$ where Me is one or more of B, Ga, Si, Ge, Zn, Mg, Fe, Co, Ni, Be, Mn, Ti, Zr, and, where x=0.00-0.2, y=0.6-1.2, z=0.6-1.2 and n<0.2, and having a unique diffraction pattern as given TABLE 5.

16. A method of synthesizing a crystalline aluminophosphate compound having an x-ray diffraction pattern including the lines substantially as set forth in TABLE 2 of the specification by mixing together a source of alumina, phosphorous, water, and organic directing agent, and heating at a temperature and time sufficient to crystallize the aluminophosphate.

17. A method of synthesizing a crystalline metalloaluminophosphate compound an x-ray diffraction pattern including the lines substantially as set forth in TABLE 3 of the specification by mixing together a source of metal, alumina, phosphorous, water, and organic directing agent, and heating at a temperature and time sufficient to crystallize the metalloaluminophosphate.

18. A crystalline material whose structure has the subunits given in TABLE 8.

19. A crystalline material whose structure has the subunits given in TABLE 9.

20. A method for synthesizing crystalline material exhibiting a characteristic X-ray diffraction pattern including d-spacing values shown in TABLE 2 which comprises (i) preparing a mixture capable of forming said by mixing together a source of alumina, phosphorous, organic directing agent (R), and water with a composition, in terms of mole ratios, within the following ranges:

| | |
|---|---|
| $P_2O_5/Al_2O_3$ | 0.5-2 |
| $R/Al_2O_3$ | 0.1-4 |
| $H_2O/Al_2O_3$ | 20-1000 |

(ii) maintaining said mixture under sufficient conditions including a temperature of from about 100° C. to about 220° C. until crystals of said material are formed; and (iii) recovering said crystalline material from step (ii).

21. The method of claim 20 wherein said mixture has a composition, in terms of mole ratios, within the following ranges:

| | |
|---|---|
| $P_2O_5/Al_2O_3$ | 0.9-1.1 |
| $R/Al_2O_3$ | 0.3-1.0 |
| $H_2O/Al_2O_3$ | 30-80 |

22. The method of claim 20 where said organic direction agent (R) is hexamethonium.

23. The method of claim 21 where said organic directing agent (R) is hexamethonium.

24. A method for synthesizing crystalline material exhibiting a characteristic X-ray diffraction pattern including d-spacing values shown in TABLE 3 which comprises (i) preparing a mixture capable of forming said by mixing together a source of metal (Me), alumina, phosphorous, organic directing agent (R), water, with a composition, in terms of mole ratios, within the following ranges:

| | |
|---|---|
| $P_2O_5/Al_2O_3$ | 0.5-2 |
| $R/Al_2O_3$ | 0.1-4 |
| $H_2O/Al_2O_3$ | 20-1000 |
| $Me/Al_2O_3$ | 0.01-2.0 |

(ii) maintaining said mixture under sufficient conditions including a temperature of from about 100° C. to about 220° C. until crystals of said material are formed; and (iii) recovering said crystalline material from step (ii).

25. The method of claim 24 wherein said mixture has a composition, in terms of mole ratios, within the following ranges:

| | |
|---|---|
| $P_2O_5/Al_2O_3$ | 0.9-1.1 |
| $R/Al_2O_3$ | 0.3-1.0 |
| $H_2O/Al_2O_3$ | 30-80 |
| $Me/Al_2O_3$ | 0.01-0.6. |

26. The method of claim 25 where said organic direction agent (R) is hexamethonium.

27. The method of claim 25 where said organic directing agent (R) is hexamethonium.

28. The method of claim 24 where said metal (Me) is one or more of B, Ga, Si, Ge, Zn, Mg, Fe, Co, Ni, Be, Mn, Ti, Zr.

29. The method of claim 25 where metal (Me) is one or more of B, Ga, Si, Ge, Zn, Mg, Fe, Co, Ni, Be, Mn, Ti, Zr.

30. The method of claim 24 wherein AlPO EMM-3 seeds are included in said mixture.

31. The method of claim 25 wherein AlPO EMM-3 seeds are included in said mixture.

32. The method of claim 28 where said source of metal (Me) is tetraethylorthosilicate.

33. The method of claim 29 wherein said source of metal (Me) is tetraethylorthosilicate.

* * * * *